United States Patent
Bechtold

(10) Patent No.: US 8,663,519 B2
(45) Date of Patent: Mar. 4, 2014

(54) METHOD AND DEVICE FOR PRODUCING FIBER-REINFORCED PLASTIC PROFILE PARTS

(75) Inventor: Michael Bechtold, Moensheim (DE)

(73) Assignee: AIRBUS Operations GmbH, Hamburg (DE)

( * ) Notice: Subject to any disclaimer, the term of this patent is extended or adjusted under 35 U.S.C. 154(b) by 170 days.

(21) Appl. No.: 12/918,765

(22) PCT Filed: Feb. 19, 2009

(86) PCT No.: PCT/EP2009/051985
§ 371 (c)(1),
(2), (4) Date: Dec. 20, 2010

(87) PCT Pub. No.: WO2009/103768
PCT Pub. Date: Aug. 27, 2009

(65) Prior Publication Data
US 2011/0088538 A1 Apr. 21, 2011

Related U.S. Application Data

(60) Provisional application No. 61/030,413, filed on Feb. 21, 2008.

(30) Foreign Application Priority Data

Feb. 21, 2008 (DE) .......................... 10 2008 010 228

(51) Int. Cl.
*B29C 67/00* (2006.01)
(52) U.S. Cl.
USPC ........................................ 264/136

(58) Field of Classification Search
USPC ......................................... 264/136
See application file for complete search history.

(56) References Cited

U.S. PATENT DOCUMENTS 3,058,704 A 10/1962 Bergstedt
4,673,606 A 6/1987 Unden et al.
(Continued)

FOREIGN PATENT DOCUMENTS

CN 1814432 A 8/2006
DE 42 08 670 A1 9/1993
(Continued)

OTHER PUBLICATIONS

PCT International Search Report and Written Opinion, PCT/EP2009/051985, Jul. 27, 2009, 22 Pages.
(Continued)

*Primary Examiner* — Larry Thrower
(74) *Attorney, Agent, or Firm* — Fenwick & West LLP

(57) ABSTRACT

The present invention provides a method for the production of a fiber-reinforced plastics material profiled part. The method comprises the supplying of a tubular fiber braid in which a polymer matrix is arranged by being distributed therein. A longitudinal portion of the fiber braid is enclosed in a molding press. The molding press is heated to cure the polymer matrix in the longitudinal portion. After the press is opened, the fiber braid is drawn through the open press in order to position a further longitudinal portion of the fiber braid in the molding press. The further longitudinal portion is enclosed in the press. Another aspect of the invention is the provision of a device for the production of a fiber-reinforced plastics material profiled part.

12 Claims, 4 Drawing Sheets

(56) References Cited

U.S. PATENT DOCUMENTS

| | | | |
|---|---|---|---|
| 5,043,128 A * | 8/1991 | Umeda | 264/258 |
| 5,132,070 A | 7/1992 | Paul et al. | |
| 5,320,696 A | 6/1994 | McConnell et al. | |
| 5,381,944 A | 1/1995 | Makowiecki et al. | |
| 5,417,385 A | 5/1995 | Arnold et al. | |
| 5,429,326 A | 7/1995 | Garesche et al. | |
| 5,468,327 A | 11/1995 | Pawlowicz et al. | |
| 5,866,272 A | 2/1999 | Westre et al. | |
| 5,902,498 A | 5/1999 | Mistry et al. | |
| 5,951,800 A | 9/1999 | Pettit | |
| 6,114,050 A | 9/2000 | Westre et al. | |
| 6,479,124 B1 | 11/2002 | Porte et al. | |
| 6,534,194 B2 | 3/2003 | Weihs et al. | |
| 6,648,273 B2 | 11/2003 | Anast | |
| 6,736,919 B1 | 5/2004 | Roebroeks | |
| 6,736,942 B2 | 5/2004 | Weihs et al. | |
| 6,991,856 B2 | 1/2006 | Weihs et al. | |
| 7,052,573 B2 | 5/2006 | Pham et al. | |
| 7,115,323 B2 | 10/2006 | Westre et al. | |
| 7,354,659 B2 | 4/2008 | Duckham et al. | |
| 7,361,412 B2 | 4/2008 | Wang et al. | |
| 7,560,152 B2 | 7/2009 | Rajabali et al. | |
| 7,635,076 B2 | 12/2009 | Duckham et al. | |
| 7,644,854 B1 | 1/2010 | Holmes et al. | |
| 2002/0069944 A1 | 6/2002 | Weihs et al. | |
| 2003/0168555 A1 | 9/2003 | Livi et al. | |
| 2004/0149813 A1 | 8/2004 | Weihs et al. | |
| 2005/0051607 A1 | 3/2005 | Wang et al. | |
| 2006/0147704 A1 | 7/2006 | Pham et al. | |
| 2006/0219759 A1 | 10/2006 | Duckham et al. | |
| 2007/0023489 A1 | 2/2007 | Swiston et al. | |
| 2007/0235500 A1 | 10/2007 | Suh et al. | |
| 2008/0063889 A1 | 3/2008 | Duckham et al. | |
| 2008/0093418 A1 | 4/2008 | Weihs et al. | |
| 2008/0110962 A1 | 5/2008 | Saxena et al. | |
| 2008/0272181 A1 | 11/2008 | Wang et al. | |
| 2008/0299410 A1 | 12/2008 | Duckham et al. | |
| 2008/0314735 A1 | 12/2008 | Weihs et al. | |
| 2009/0065554 A1 | 3/2009 | Heerden et al. | |
| 2009/0173626 A1 | 7/2009 | Duckham et al. | |
| 2009/0186195 A1 | 7/2009 | Spraker et al. | |
| 2009/0242615 A1 | 10/2009 | Saxena et al. | |

FOREIGN PATENT DOCUMENTS

| | | |
|---|---|---|
| DE | 43 42 575 A1 | 4/1995 |
| DE | 10 61 240 C1 | 7/2003 |
| DE | 103 34 391 A1 | 3/2005 |
| DE | 601 05 084 T2 | 8/2005 |
| DE | 10 2005 027 879 A1 | 12/2006 |
| EP | 0 281 130 A2 | 9/1988 |
| EP | 0 514 718 A1 | 11/1992 |
| EP | 0561151 A1 | 9/1993 |
| EP | 1 894 706 A1 | 3/2008 |
| JP | 2002-528294 A | 9/2002 |
| JP | 2003-138136 A | 5/2003 |
| JP | 2003-221765 A | 8/2003 |
| JP | 2004/130777 A | 4/2004 |
| JP | 2005-59260 A | 3/2005 |
| WO | WO 92/13706 A | 8/1992 |
| WO | WO 97/34763 A1 | 9/1997 |
| WO | WO 2005/032805 A1 | 4/2005 |

OTHER PUBLICATIONS

Office Action cited in German Application No. 10 2008 010 228.8, Oct. 2, 2008, 5 Pages.

Chinese Office Action, Chinese Application No. 200980105751.7, Nov. 27, 2012, 10 pages. (with partial translation).

Japanese Office Action, Japanese Application No. 2010-547183, Jun. 27, 2013, 4 pages.

PCT International Search Report and Written Opinion, PCT/EP2009/051985, Jul. 27, 2009, 13 Pages.

Office Action cited in German Application No. 10 2008 010 228.8, Oct. 2, 2008, 3 Pages.

Milwich, M., et al., "Herstellung Von Faserverstarktem Thermoplastischem Halbzeug Durch Pultrusion," Institut fur Textill—and Verfahrenstechnik Denkendorf, 2001, 6 Pages, With English Abstract.

* cited by examiner

Fig. 3A
Fig. 3B
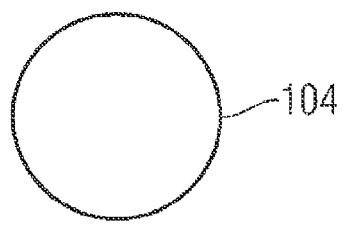
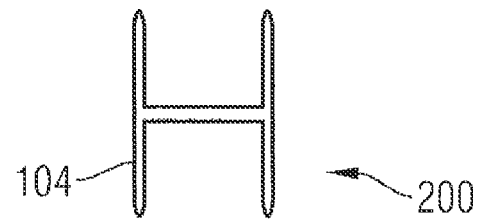
Fig. 4A
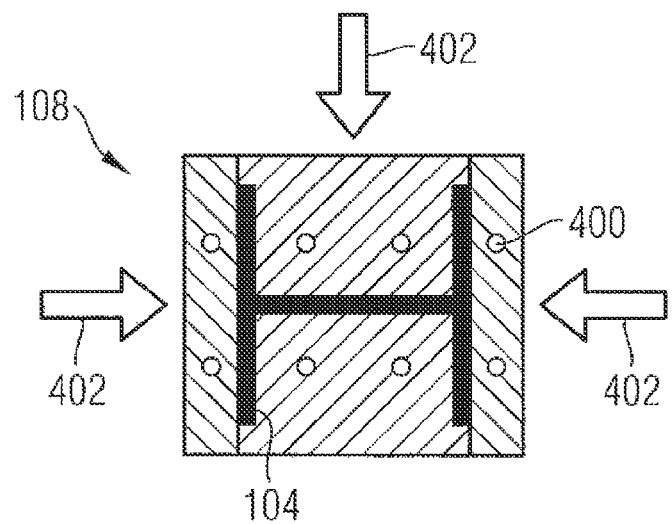
Fig. 4B
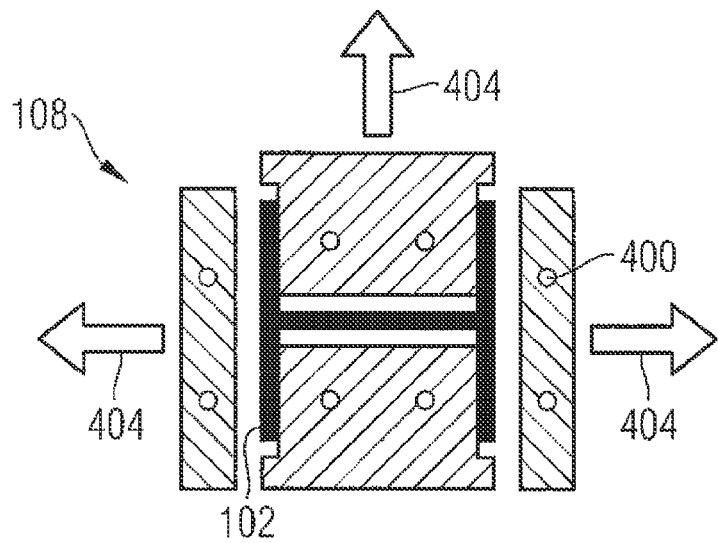

METHOD AND DEVICE FOR PRODUCING FIBER-REINFORCED PLASTIC PROFILE PARTS

CROSS-REFERENCE TO RELATED APPLICATIONS

This application claims the benefit of U.S. Provisional Application No. 61/030,413, filed Feb. 21, 2008 and German Patent Application No. 10 2008 010 228.8, filed Feb. 21, 2008, the entire disclosures of which are herein incorporated by reference.

FIELD OF THE INVENTION

The present invention relates to a method and device for the production of a fibre-reinforced plastics material profiled part, in particular a plastics material profiled part for an aircraft or spacecraft.

Although the present invention and the problem on which it is based can be applied to fibre-reinforced plastics material profiled parts with any profile shapes, they will be described with respect to the production of plastics material profiled parts which have I- and T-shaped profiles.

In a conventional method for the production of plastics material profiled parts of this type, which method is also called pultrusion, a bundle of fibres is impregnated with a heat-curable resin and drawn through a heated forming nozzle having the desired profile, whereupon the resin cures. In plastics material profiled parts produced in this way, the fibres run substantially in the longitudinal direction of the plastics material profiled parts and thus torsional stresses and peeling stresses which are produced with a corresponding load can cause the resin to break between parallel-running fibres.

In so-called braiding pultrusion, instead of using a bundle of unidirectional fibres, a fibre braid is used in which the fibres run in spiral form with an inclination angle to the longitudinal direction of the plastics material profiled part and, in this manner, also absorb torsional and peeling stresses. However, when such a fibre braid consisting of interlaced fibres is drawn into the forming nozzle, considerable frictional forces arise which can damage the fibres and can result in quality defects.

SUMMARY OF THE INVENTION

Therefore, the object of the present invention is to achieve a high stability during the production of fibre-reinforced plastics material profiled parts particularly with regard to torsional and peeling stresses and, in so doing, to reliably avoid any damage to the fibres.

This object is achieved according to the invention by a method for the production of a fibre-reinforced plastics material profiled part, and by a device for the production of a fibre-reinforced plastics material profiled part.

The idea on which the present invention is based is to supply the fibres which are used in the production of the plastics material profiled part in the form of a tubular braid in which a polymer matrix is arranged by being distributed therein. A longitudinal portion of the supplied fibre braid is enclosed in a heatable moulding press. The moulding press is heated and in this way heats the enclosed longitudinal portion. Consequently, the polymer matrix softens (if it is in solid form) and fills the gaps between the fibres due to the moulding pressure built up by the moulding press. In the case of a duroplastic resin, the polymer matrix cures under the influence of the heating of the moulding press.

The moulding press is then opened so that it no longer encloses the longitudinal portion of the fibre braid and no longer exerts a compression action thereon. The fibre braid is drawn through the open moulding press until a further longitudinal portion of the fibre braid is positioned in the moulding press. The moulding press then encloses this further longitudinal portion so that the polymer matrix in the further longitudinal portion is distributed or cured between the fibres under the influence of the heated moulding press.

In this manner, the fibre braid is embedded in the polymer matrix both in the region of the first-mentioned longitudinal portion and in the further longitudinal portion, so that corresponding portions of a fibre-reinforced plastics material profiled part are produced in both longitudinal portions. This makes it possible for a plastics material profiled part of basically an unrestricted length to be produced, in that the steps of enclosing the fibre braid in the moulding press, opening the press and drawing the fibre braid are repeated cyclically and, in so doing, the fibre braid is respectively drawn through the open moulding press by an extent which is not greater than the longitudinal portion respectively enclosed in the moulding press.

Since the fibres are supplied in the form of a tubular fibre braid, at least some of the fibres in the finished plastics material profiled part run at an inclination angle around the periphery of the plastics material profiled part and thus a proportion of the fibres run in the peripheral direction. It is for this reason that the plastics material profiled parts produced thus have a particularly high stability. Since the fibre braid is drawn through the moulding press when it is open, there are no frictional forces or only very low frictional forces to be overcome during the drawing procedure, which makes it possible to effectively avoid any damage to the fibres. Furthermore, it is possible to set the tensile stress at a defined low value, thereby also allowing fibre braids to be processed in which fibres run at a large angle to the longitudinal direction of the tubular shape of the braid, without the braid being distorted by considerable tensile stresses or being pulled out in length.

The entire method can be automated particularly easily because the fibre braid can be produced without complex manual actions.

According to a preferred development, the supplying of the tubular fibre braid includes a step of braiding the fibre braid from a large number of fibre threads. Carrying out the braiding procedure in advance makes it possible to continuously produce plastics material profiled parts as required, without necessitating the storage of prefabricated fibre braids.

According to a preferred development, the supplying of the tubular fibre braid includes a step of unwinding the fibre braid from a provided supply coil. This has the advantage that a separate braiding means is unnecessary which, for example, makes it possible for the fibre braid to be prefabricated by a supply company.

According to a preferred development, the moulding press compresses the longitudinal portion, when enclosed, according to an intended profile of the plastics material profiled part. Furthermore, in this respect a step of gradually reshaping the tubular fibre braid into the intended profile is provided by a large number of reshaping rollers. In this manner, diverse profile shapes can be produced based on the originally tubular fibre braid, without considerable frictional forces arising or damage to the fibres being expected.

According to a preferred development, when it is being reshaped, the tubular fibre braid is pressed flat. This advantageously allows the production of plastics material profiled parts with a solid profile, i.e. without an enclosed cavity.

According to a preferred development, a plurality of tubular fibre plies is supplied and is jointly enclosed by the moulding press in the longitudinal portion. In this manner, an even greater diversity of profile shapes is possible, for example multiply ramified profile shapes.

According to a preferred development, the polymer matrix is arranged in a distributed manner in the tubular fibre braid by the interlacing of thermoplastic fibres. In this manner, the polymer matrix is distributed automatically with the braiding procedure, so that a separate step is not required.

According to a preferred development, the polymer matrix is arranged in the tubular fibre braid by introducing a resin film into the tube. The polymer matrix is held securely inside the tube and is distributed uniformly by the two-dimensional expansion of the film.

According to a preferred development, the polymer matrix is arranged in the tubular fibre braid by wetting the fibre braid with a liquid or powdered resin. This allows the polymer matrix to be distributed uniformly in three dimensions.

According to a preferred development, the tubular fibre braid is supplied as a prepreg. In this manner, the fibre braid with the polymer matrix distributed therein can be pre-produced separately and can be supplied, as required, to the further steps of the method.

According to a preferred development, the longitudinal portion is partially cured in the moulding press. This makes it possible for the polymer matrix to finally cure in another manner in a region which is not restricted to the longitudinal portion, such that a plastics material profiled part can be produced substantially without transitions between adjacent longitudinal portions. The longitudinal portion is preferably partially cured to approximately 70% so that, after leaving the moulding press, the shape of the profiled part remains stable. A further step of completely curing the longitudinal portion after it has been drawn through the moulding press is preferably provided, so that the plastics material profiled part is completely stabilised as soon as possible.

Furthermore, according to a preferred development, a step of deflashing the plastics material profiled part is provided. This makes it possible to produce, without a transition, the edges between adjacent longitudinal portions such that they are without outer flashes.

Furthermore, according to a preferred development, a step of cutting up the plastics material profiled part in a substantially longitudinal manner is provided to form further plastics material profiled parts. This makes it possible to produce plastics material profiled parts with profile cross-sections which are variable over their length.

BRIEF DESCRIPTION OF THE DRAWINGS

In the following, the invention will be described in detail on the basis of embodiments with reference to the accompanying figures of the drawings.

FIG. 3A-B are cross-sectional views of two reshaping stages in a production method according to a further embodiment;

FIG. 4A-B are cross-sectional views of a moulding press while a production method according to an embodiment is being carried out;

Figure 1:
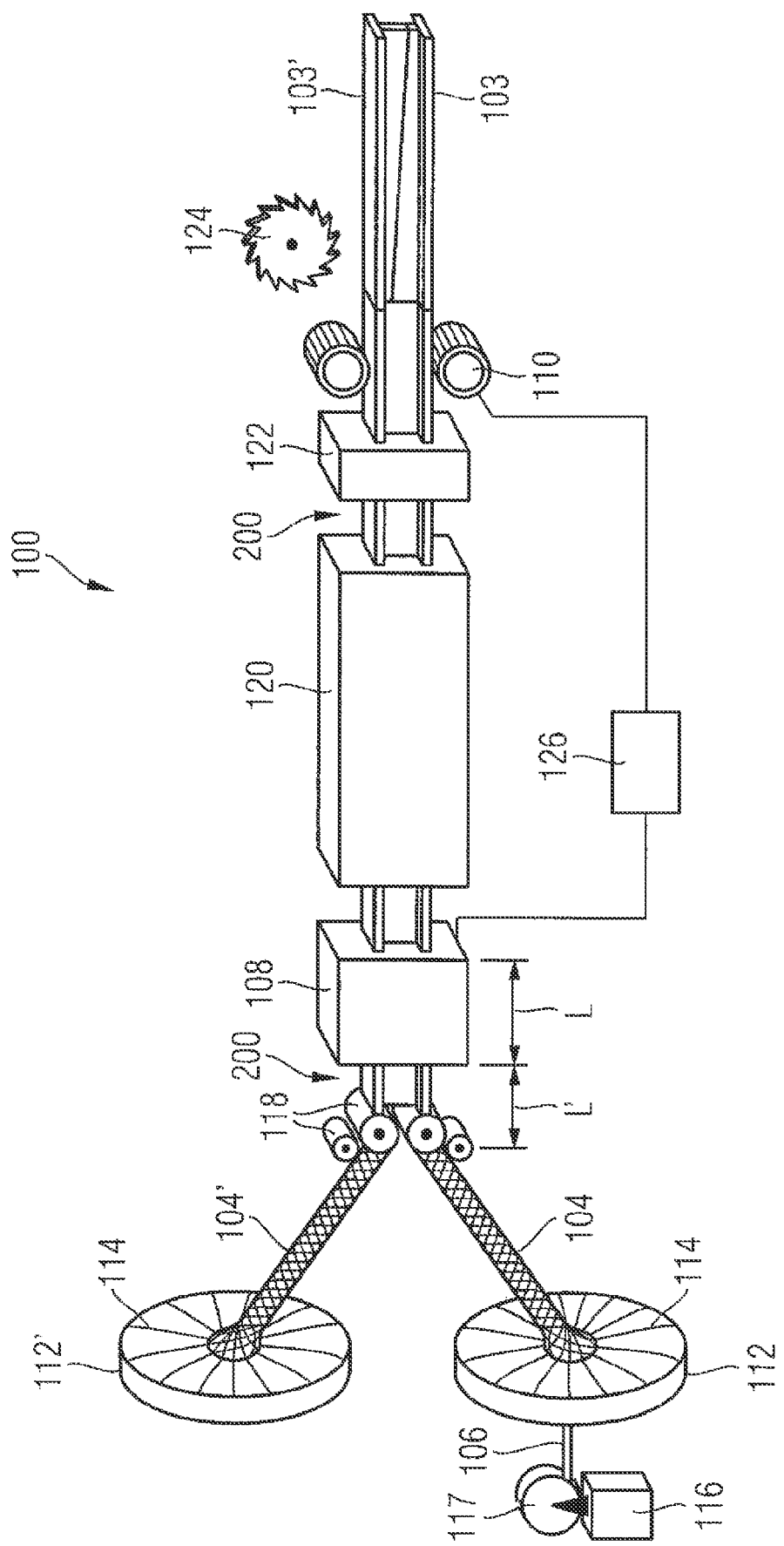
FIG. 1 is a schematic perspective view of a device for the production of a fibre-reinforced plastics material profiled part according to an embodiment of the invention.

DESCRIPTION OF EXEMPLARY
EMBODIMENTS

In the figures, the same reference numerals denote the same or functionally identical components, unless indicated otherwise.

FIG. 1 is a schematic perspective view of a device 100 for the production of fibre-reinforced plastics material profiled parts 102, 103, 103'. The device 100 comprises a first braiding means 112 and a second braiding means 112' for braiding a respective tubular fibre braid 104, 104' from a respective plurality of fibre threads 114, 114'. A resin film laying means 116 supplies the first braiding means 112 with a strip-shaped film 106 made from an uncured resin 106 from a continuous roll 117, such that the resin 106 comes to rest inside the tubular braid 104.

The fibre braids 104, 104', which have been braided by the first braiding means 112 and the second braiding means 112' during operation of the device, run together to a system of reshaping rollers 118 which initially flatten each of the fibre braids 104, 104' and then continuously reshape the two fibre braids 104, 104' into a jointly formed I-profile shape 200 which corresponds to the intended profile 200 of a plastics material profiled part 102 to be produced. Four reshaping rollers 118 are shown purely by way of example.

Arranged on the side of the reshaping rollers 118 remote from the braiding means 112 is a heatable moulding press 108 which can be intermittently opened and closed by a control device 126. In the closed state, a cavity remains inside the moulding press 108, which cavity is open at both ends and is of length L, having the I-shaped intended profile 200 of the plastics material profiled part 102 to be produced. In the open state, the cavity of length L is wider than the intended profile 200, such that an object with the intended profile 200 can be moved without friction through the moulding press.

Arranged on the side of the moulding press 108 remote from the reshaping rollers 118 is the inlet of a tunnel furnace 120 for fully curing the plastics material profiled parts 102, 103, 103' to be produced. A deflashing means 122 is connected to the outlet of the tunnel furnace 120. The reshaping rollers 118, the moulding press 108, the tunnel furnace 120 and the deflashing means 122 are arranged linearly one after the other as described and together form a production path 118, 108, 120, 122 along which, during operation of the device 100, the fibre braids 104, 104' are processed into the plastics material profiled part to be produced.

Arranged on the side of the deflashing means remote from the tunnel furnace 120 is a drawing means 110 for drawing the fibre braids 104, 104' or the plastics material profiled part 102 being produced therefrom along the production path 118, 108, 120, 122 which is connected to the control device 126 for activation. Arranged on the side of the drawing means 110 remote from the deflashing means 122 is a cutting means 124 for cutting the plastics material profiled part 102 to be produced into lengths and optionally for further processing into further plastics material profiled parts 103, 103'.

During operation of the device 100, the control device 126 cyclically activates the heated moulding press 108 and the drawing means 122 in a coordinated manner. During one cycle, the moulding press 108 is initially closed to enclose a longitudinal portion L of the fibre braids 104, 104' brought into the intended shape 200 by the reshaping rollers 118. The result of this is that the contained resin film 106 softens, fills the gaps between the fibres owing to the pressure built up by the moulding press and partially cures under the further influence of the heat. The moulding press 108 is opened before the resin 106 has completely cured. The control device 126 then activates the drawing means 110 such that it draws the plastics material profiled part 102 or the fibre braids 104, 104' contained in the plastics material profiled part 102 by a distance of the length L along the production path 118, 108, 120, 122, 110. The cycle then restarts and now a new longitudinal portion L' is enclosed in the moulding press 108 which portion L' is adjacent to the portion L enclosed during the preceding cycle. In the tunnel furnace 120, a temperature distribution is constantly maintained which effects the complete curing of the portions L, L', which were initially partially cured in the moulding press 108 and follow one another continuously. Possible flashes between the portions L, L' are removed by the deflashing means 122.

Figure 2A:
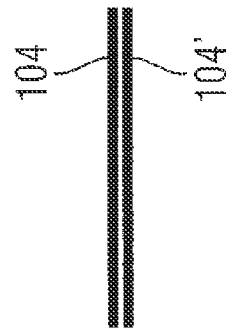
FIG. 2A-F are cross-sectional views of various reshaping stages of a tubular fibre braid in a production method according to an embodiment.
Figure 2B:
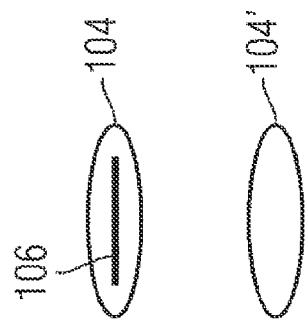
Figure 2C:
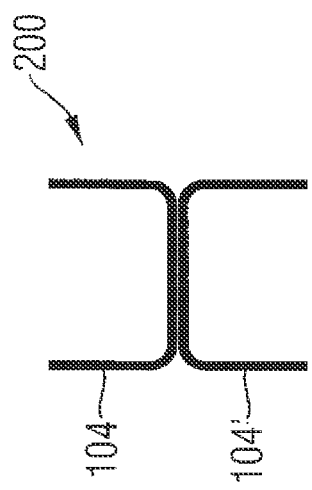
Figure 2D:
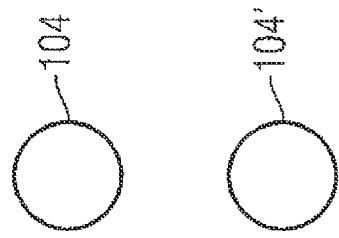
Figure 2E:
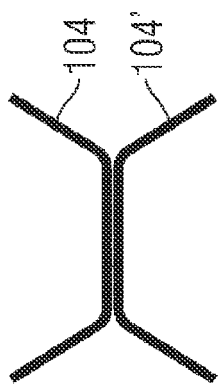
Figure 2F:
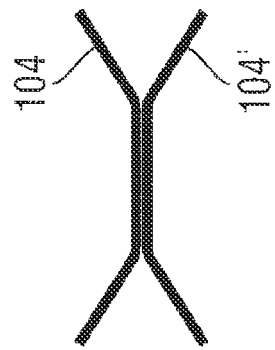

FIG. 2A to 2F are cross-sectional views of various reshaping stages of two tubular fibre braids, for example by means of the reshaping rollers 118 of the device 100 from FIG. 1. FIG. 1A shows the tubular braids 104, 104' in their initial cylindrical shape in which they are braided by the braiding means. FIG. 2B shows the braids in a profile shape which is flattened in the manner of an ellipse, a resin film 106 having been introduced into one of the braids 104. In FIG. 2C, both braids 104, 104' have been folded completely flat and arranged parallel to one another. FIG. 2D-F show the gradual reshaping of the fibre braids 104, 104', which now contact one another, into a combined I-shaped intended profile 200.

FIGS. 3A and 3B are cross-sectional views of two reshaping stages for an alternative reshaping procedure, in which a single tubular braid 104 is likewise reshaped into an exemplary I-shaped intended profile 200 by corresponding reshaping rollers.

FIGS. 4A and 4B are cross-sectional views of a moulding press, for example the press 108 shown in FIG. 1, in different stages of the production cycle. FIG. 4A shows the moulding press in a state after it has been closed 402, in which it partially cures the polymer matrix distributed in the enclosed fibre braid 104. Heating wires 400 are arranged in the individual segments of the moulding press. FIG. 4B shows the same press after it has been opened 404.

Figure 5A:
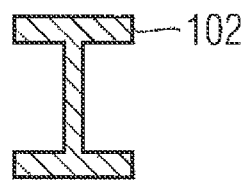
FIG. 5A-B are a profile view and a side view of a fibre-reinforced plastics material profiled part according to an embodiment.
Figure 5B:
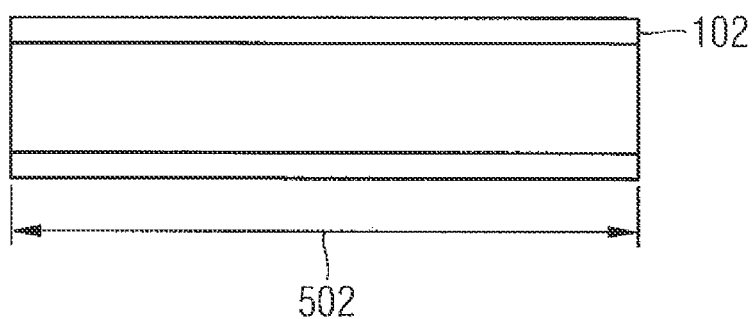

FIGS. 5A and 5B are respectively a profile view and a side view of a fibre-reinforced plastics material profiled part 102, for example a plastics material profiled part 102 which has been produced by means of the device 100 from FIG. 1 according to the method described therein and has been cut to a required total length 502.

Figure 5C:
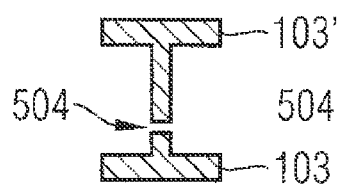
FIG. 5C-D are a profile view and a side view of the plastics material profiled part from FIG. 5A-B after making a cut according to an embodiment of the production method.
Figure 5D:
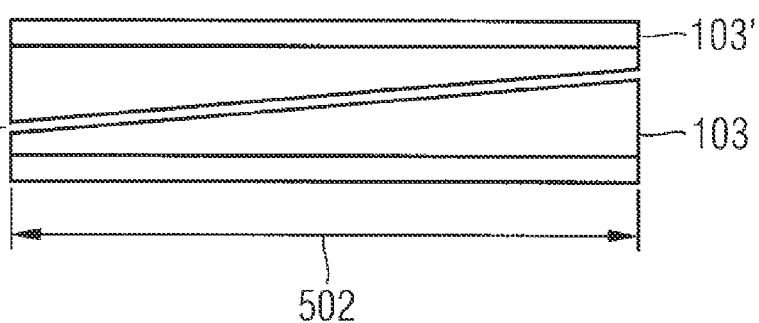
Figure 5E:
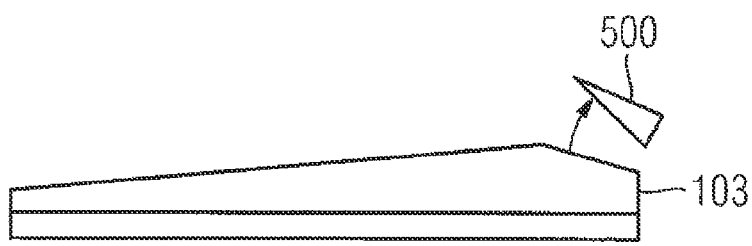
FIG. 5E is a side view of a further fibre-reinforced plastics material profiled part according to an embodiment.

FIGS. 5C and 5D are respectively a profile view and a side view of the plastics material profiled part 102 from FIGS. 5A and 5B which has been longitudinally divided to produce further, T-shaped plastics material profiled parts 103, 103' having a slightly inclined longitudinal cut running along the entire length 502. FIG. 5E shows one of the plastics material profiled parts 103 from FIGS. 5C and 5D, the shape of which has been further modified by cutting off a reject 500, for example in order to make it suitable for use in an aircraft or spacecraft.

Although the present invention has been described here on the basis of preferred embodiments, it is not restricted thereto, but can be modified in a multiplicity of different ways.

For example, instead of a duroplastic resin, it is also possible to use thermoplastic polymer matrices, particularly if the moulding press is fitted with a cooling means for cooling the thermoplastic polymers. Braids with additional longitudinal fibres can also be used. Profiled parts can be formed from interlocking, jointly braided tubular braids.

LIST OF REFERENCE NUMERALS

| | |
|---|---|
| 100 | production device |
| 102 | plastics material profiled part |
| 103, 103' | modified plastics material profiled part |
| 104 | fibre braid |
| 106 | polymer matrix |
| 108 | moulding press |
| 110 | drawing means |
| 112, 112' | braiding means |
| 114, 114' | fibre threads |
| 116 | resin film laying means |
| 117 | resin film roll |
| 118 | reshaping rollers |
| 120 | post-curing furnace |
| 122 | deflashing means |
| 124 | cutting means |
| 126 | control device |
| 200 | intended profile |
| 400 | heating means |
| 402 | closure of moulding press |
| 404 | opening of moulding press |
| 500 | reject |
| 502 | total length |
| 504 | longitudinal cut |

The invention claimed is:

1. A method for production of a fibre-reinforced plastics material profiled part, comprising:
   supplying at least one tubular fibre braid that is braided from a plurality of fibre threads, wherein a polymer matrix is arranged within the at least one tubular fibre braid;
   flattening the at least one tubular fibre braid;
   subsequently enclosing a longitudinal portion of the at least one flattened tubular fibre braid in a moulding press, wherein the moulding press compresses said longitudinal portion according to an intended profile of the plastics material profiled part;
   heating the moulding press;
   opening the moulding press to release the at least one fibre braid;
   drawing the at least one fibre braid through the open moulding press to position a further longitudinal portion of the at least one fibre braid in the moulding press; and
   enclosing the further longitudinal portion in the moulding press.

2. The method according to claim 1, further comprising:
   reshaping the at least one tubular fibre braid into the intended profile of the plastics material profiled part with a plurality of reshaping rollers.

3. The method according to claim 2, wherein the at least one tubular fibre braid is pressed flat when being reshaped.

4. The method according to claim 1, wherein a plurality of tubular fibre braids are supplied and jointly enclosed by the moulding press in the longitudinal portion.

5. The method according to claim 1, wherein the polymer matrix is arranged in a distributed manner in the at least one tubular fibre braid by interlacing of thermoplastic fibres.

6. The method according to claim 1, wherein the polymer matrix is arranged in the at least one tubular fibre braid by introducing a resin film into the at least one fibre braid.

7. The method according to claim 1, wherein the polymer matrix is arranged in the at least one tubular fibre braid by wetting the at least one fibre braid with a liquid or powdered resin.

8. The method according to claim 1, wherein the at least one tubular fibre braid is supplied as a prepreg.

9. The method according to claim 1, wherein the longitudinal portion is cured partially in the moulding press.

10. The method according to claim 9, further comprising:
   completely curing the longitudinal portion after the longitudinal portion has been drawn through the moulding press.

11. The method according to claim 1, further comprising: deflashing the plastics material profiled part.

12. The method according to claim 1, further comprising:
   cutting up the plastics material profiled part in a substantially longitudinal manner to form further plastics material profiled parts.

* * * * *